United States Patent
Fawaz et al.

(10) Patent No.: US 9,313,851 B2
(45) Date of Patent: Apr. 12, 2016

(54) STANDBY POWER FOR LED DRIVERS

(71) Applicant: Infineon Technologies AG, Neubiberg (DE)

(72) Inventors: Ali Fawaz, Dearborn, MI (US); Robert Pizzuti, Rochester Hills, MI (US); Marcus Schaemann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/281,427

(22) Filed: May 19, 2014

(65) Prior Publication Data

US 2015/0334800 A1 Nov. 19, 2015

(51) Int. Cl.
*H05B 37/02* (2006.01)
*H05B 33/08* (2006.01)

(52) U.S. Cl.
CPC ........ *H05B 33/0845* (2013.01); *H05B 33/0812* (2013.01)

(58) Field of Classification Search
USPC ........................ 315/209 R, 219, 291, 307, 308
See application file for complete search history.

(56) References Cited

U.S. PATENT DOCUMENTS

| | | | |
|---|---|---|---|
| 2011/0266969 A1* | 11/2011 | Ludorf | 315/294 |
| 2013/0134891 A1* | 5/2013 | Woytowitz | 315/201 |
| 2013/0134894 A1 | 5/2013 | Kuang | |
| 2014/0152183 A1* | 6/2014 | Kim et al. | 315/155 |
| 2014/0226370 A1* | 8/2014 | Ludorf | 363/21.12 |
| 2014/0252974 A1* | 9/2014 | Kim et al. | 315/206 |
| 2014/0346973 A1* | 11/2014 | Zhu et al. | 315/307 |

OTHER PUBLICATIONS

"Single-Stage Flyback and PFC Controller for LED Lighting Applicaitons," Infineon Data Sheet ICL8001G, Version 1.0, May 6, 2010, 16 pp.

* cited by examiner

*Primary Examiner* — Thuy Vinh Tran
(74) *Attorney, Agent, or Firm* — Shumaker & Sieffert, P.A.

(57) ABSTRACT

Methods, devices, and circuits are disclosed for regulating a first parameter of one or more LEDs. The methods, devices, and circuits further disclose switching, in response to an indication of a dimmer interface, from regulating the first parameter of the one or more LEDs to regulating a second parameter below a light generation threshold of the one or more LEDs, wherein switching from regulating the first parameter to regulating the second parameter causes the one or more LEDs to enter a non-light generation mode.

21 Claims, 5 Drawing Sheets

STANDBY POWER FOR LED DRIVERS

TECHNICAL FIELD

The invention relates to light-emitting-diodes (LEDs) and techniques for controlling LEDs.

BACKGROUND

Power converters, including flyback converters and buck-boost converters, may be used as drivers for loads with specific current and/or voltage requirements, such as chains of light-emitting diodes (LEDs). The light intensity of an LED chain is controlled by the amount of current flowing through it. Generally, a closed loop current control may be used to keep the current constant. For lighting with a high current load, switched-mode controllers may be used. Single-stage power converters (e.g., flyback converters, buck-boost converters), in some examples, may regulate the current or voltage of the power output with a single magnetic and switching element.

SUMMARY

In general, various examples of this disclosure are directed to current regulation single-stage power converters with regulation generated by either voltage mode control or current mode control. Various examples of this disclosure may actively regulate output voltage below the nominal voltage of light-emitting-diodes (LEDs), thereby making the voltage at the output insufficient to produce light from the LEDs. Various examples of this disclosure may also enhance the capability of reaching the desired voltage value, thereby reducing or virtually eliminating the risk of shutting down the feedback control circuits, and without the need for an additional switch or a secondary power supply.

In one example, the disclosure is directed to a method comprising regulating a first parameter of one or more light emitting diodes (LEDs) connected to one or more components, and switching, in response to an indication from a dimmer interface, from regulating the first parameter of the one or more LEDs to regulating a second parameter below a light generation threshold of the one or more LEDs, wherein switching from regulating the first parameter to regulating the second parameter causes the one or more LEDs to enter a non-light generation mode.

In another example, the disclosure is directed to a device comprising one or more components configured to apply at least one of a regulated current or a regulated voltage at a load, wherein the load includes one or more light-emitting-diodes (LEDs), and a controller unit configured to regulate a first parameter of the one or more LEDs connected to the one or more components, wherein the controller unit switches, in response to an indication from a dimmer interface, from regulating the first parameter of the one or more LEDs to regulating a second parameter below a light generation threshold of the one or more LEDs, wherein switching from regulating the first parameter to regulating the second parameter causes the one or more LEDs to enter a non-light generation mode.

In another example, the disclosure is directed to a circuit comprising one or more components configured to apply at least one of a regulated current or a regulated voltage at a load, wherein the load includes one or more light-emitting-diodes (LEDs), and a controller unit configured to regulate a first parameter of the one or more LEDs connected to one or more components, wherein the controller unit switches, in response to an indication from a dimmer interface, from regulating the first parameter of the one or more LEDs to regulating a second parameter below a light generation threshold of the one or more LEDs, wherein switching from regulating the first parameter to regulating the second parameter causes the one or more LEDs to enter a non-light generation mode.

The details of one or more embodiments of the invention are set forth in the accompanying drawings and the description below. Other features, objects, and advantages of the invention will be apparent from the description and drawings, and from the claims.

DETAILED DESCRIPTION

In a switched-mode power supply (SMPS) (e.g., a single-stage power converter), the alternating current (AC) power input, DC power input or a combination of AC and DC is filtered and directly rectified to obtain a direct current (DC) power output with a regulated current and/or voltage. Single-stage power converters are usually regulated, and to keep either the output current and/or voltage constant, the power supply employs a feedback controller that monitors current, voltage and/or power drawn by the load that is monitored via direct measured feedback or indirectly measured via inferred measurements.

In some applications, a single-stage power converter using a flyback converter (e.g., a flyback transformer) or a non-isolated buck-boost converter, such as a DC/DC converter or an AC/DC converter (hereafter referred to as a "power converter" or "converter") may receive a power (e.g., voltage, current, etc.) input and convert (e.g., by increasing or decreasing) the power input to a power (e.g., voltage, current, etc.) output that has a voltage or current that is different (e.g., regulated) than the voltage or current of the power input, for instance, to provide the power output to a load at regulated level for powering the load (e.g., a device, or LEDs).

In either case, a power converter may have one or more switches (e.g., MOS power switch transistors based switches, gallium nitride (GaN) based switches, or other types of switch devices) arranged in a power stage configuration that the power converter controls, according to one or more modulation techniques, to change the current or voltage of the power output.

A power converter may include one or more gate drivers and control logic to control (e.g., turn-on and turn-off) the one or more switches of the power stage using modulation techniques. Such modulation of the switches of a power stage may operate according to pulse-density-modulation (PDM), pulse-width-modulation (PWM), pulse-frequency-modulation (PFM), or another suitable modulation technique. By controlling the switches of a power stage using modulation techniques, a power converter can regulate the current or voltage of the power being outputted by the power converter.

Some power converters may use feedback circuits and techniques for performing current sensing and/or voltage sensing to obtain information about a current or voltage of a power output. The power converter may use the information received using feedback circuits and techniques to improve the accuracy of the power output. For example, the power converter may use the feedback information to contain the voltage or current of a power output within a particular tolerance or threshold window for satisfying the voltage and/or current requirements of a load. Some power converters may use voltage sensing as one example of feedback circuits and techniques to determine the real-time voltage of the power being outputted to a load. If the power converter determines that the voltage does not satisfy the voltage requirements of the load, then the power converter may adjust or change how the power converter controls the power switches in order to adjust or change the voltage of the power output until the voltage of the power output is contained within the tolerance window and satisfies the voltage associated with the voltage requirements of the load.

For example, some circuits may dim the LEDs down to no light generation (e.g., 0V on a 0-10V dimmer interface), but this requires a secondary power supply to keep the IC awake in order to receive the wake up signal. If there is no secondary power supply, then another option is to dim to a minimum light level, but this approach does not allow for no light generation by the LEDs. In some examples, the dimming control input could come from any source capable of providing a variable digital input (e.g., 0-10V dimmer interface, 1-10V dimmer interface, voltage interface, current interface, RF interface, digital addressable lighting interface (e.g., DALI™), phase cut dimmer, PLC, digital multiplex (DMX) lighting controller, Ethernet interface, processor, optical interface, infrared interface, or the like).

In general, circuits and techniques of this disclosure may enable a system including a single-stage power converter to output power with a voltage or current that is lower than a light generation threshold which eliminates light generation of LEDs, while providing a controller with enough power to keep the controller from shutting down, all without increasing cost, adding a secondary power supply, and/or decreasing efficiency of the power converter. In other words, this disclosure may allow the input of a dimmer interface to go to 0V or any input signifying a non-light generation mode, while eliminating the light generation of the LEDs and keeping the control circuitry from shutting down. A system with a power converter including a flyback converter may include one or more power switches, driver/control logic, and feedback control circuitry (e.g., a 0-10V dimmer interface, a microprocessor, or a radio-frequency (RF) interface, digital addressable light interface, phase cut, PLC, or the like). A flyback converter may be used in both AC/DC and DC/DC conversion with galvanic isolation or non-isolation between the input and any outputs. More precisely, the flyback converter may be an isolated buck-boost converter with a coupled inductor to form a transformer (e.g., "flyback transformer"), so that the voltage ratios are multiplied with an additional advantage of isolation.

Figure 1:
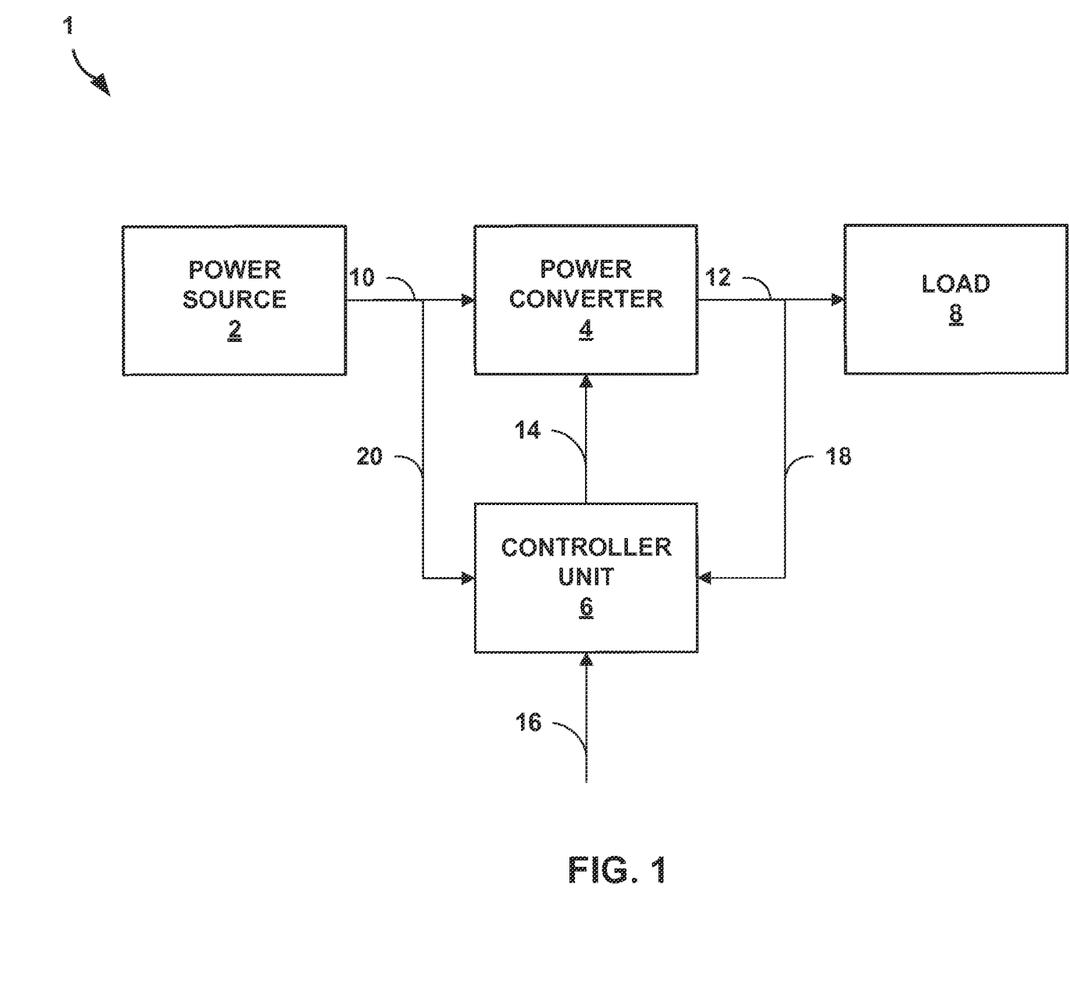
FIG. 1 is a block diagram illustrating a system for converting power from a power source, in accordance with one or more aspects of the present disclosure.

FIG. 1 is a block diagram illustrating system 1 for converting power from power source 2, in accordance with one or more aspects of the present disclosure. FIG. 1 shows system 1 as having four separate and distinct components shown as power source 2, power converter 4, controller unit 6, and load 8, however system 1 may include additional or fewer components. For instance, power source 2, power converter 4, controller unit 6, and load 8 may be four individual components or may represent a combination of one or more components that provide the functionality of system 1 as described herein.

System 1 includes power source 2 which provides electrical power to system 1. Numerous examples of power source 2 exist and may include, but are not limited to, power grids, generators, transformers, batteries, solar panels, windmills, regenerative braking systems, hydro-electrical or wind-powered generators, or any other form of devices that are capable of providing electrical power to system 1.

System 1 includes power converter 4 which operates as a switched-mode power supply that converts one form of electrical power provided by power source 2 into a different and usable form, of electrical power for powering load 8. Power converter 4 may include a flyback converter that outputs power with a higher voltage than the voltage of input power received by the flyback converter. A flyback converter may be used in both AC/DC and DC/DC conversion with galvanic isolation or non-isolation between the input and any outputs. More precisely, the flyback converter may be a buck-boost converter with a coupled inductor to form a transformer, so that the voltage ratios are multiplied with an additional advantage of isolation. Examples of power converter 4 may include battery chargers, microprocessor power supplies, and the like. Power converter 4 may operate as a DC-to-DC or AC-to-DC converter.

System 1 further includes controller unit 6 and load 8. Load 8 receives the electrical power converted by power converter 4 after the power is regulated by controller unit 6. In some examples, load 8 uses the regulated electrical power from power converter 4. Numerous examples of load 8 exist and may include, but are not limited to, light-emitting-diodes (LEDs), organic light-emitting diodes (OLEDs), quantum dot light-emitting diodes (quantum dot LEDs), electroluminescence elements, computing devices and related components, such as microprocessors, electrical components, circuits, laptop computers, desktop computers, tablet computers, mobile phones, batteries (i.e., rechargeable), speakers, lighting units, automotive/marine/aerospace/train related components, motors, transformers, or any other type of electrical device and/or circuitry that receives a voltage or a current from a power converter.

Power source 2 may provide electrical power with a voltage and/or current over link 10. Load 8 may receive electrical power that has a second voltage and/or current over link 12, converted by power converter 4, and regulated by controller unit 6 using link 14. Links 10, 12, 14, 16, 18, and 20 may represent any medium capable of conducting electrical power from one location to another. Examples of links 10, 12, and 14 include, but are not limited to, physical and/or wireless electrical transmission mediums such as electrical wires, electrical traces, conductive gas tubes, twisted wire pairs, and the like. Each of links 10 and 12 provide electrical coupling between, respectively, power source 2 and power converter 4, and power converter 4 and load 8. Link 14 provides electrical coupling between controller unit 6 and power converter 4, such that controller unit 6 sends commands to power converter 4 in order to regulate the output power of power converter 4 to delivered to load 8. In some examples, link 14 may be associated with the current sensing (CS) pin of an integrated circuit (IC). In other examples, link 14 may be associated with the gate drive (GD) pin of an IC. Link 18 provides a feedback loop or circuit for carrying information to controller unit 6 associated with the characteristics of a regulated power output from power converter 4 to load 8 over link 12. In some examples, link 18 may be associated with a supply voltage (Vcc) pin of an integrated circuit, and the supply voltage is used to power the integrated circuit. In addition, link 20 provides an input, feedback loop, or circuit for carrying information to controller unit 6 associated with the characteristics of the power output from power source 2 to power converter 4 over link 10. In some examples, link 20 may be associated with a high-voltage supply (HV) pin of an IC.

In the example of system 1, electrical power delivered by power source 2 can be converted by power converter 4 to power that has a regulated voltage and/or current that meets the voltage and/or current requirements of load 8. For instance, power source 2 may output, and power converter 4 may receive, power which has a first voltage at link 10. Power converter 4 may convert the power which has the first voltage to power which has a second voltage that is required by load 8. Power converter 4 may output the power that has the second voltage at link 12.

Controller unit 6 of system 1 is coupled to the input of power converter 4 at link 10 by link 20, the output of power converter 4 at link 12 by link 18, and receives an input at link 16. Controller unit 6 is further coupled to power converter 4 via link 14 to send signals or commands to control power converter 4 for controlling various operations of power converter 4. Link 16 delivers an input to a dimmer interface of controller unit 6, allowing controller unit 6 to adjust the power output of power converter 4 based on the input. In some examples, controller unit 6 may adjust a current of the power output of power converter 4 according to an input received by link 16 indicating a desired dimmer level of load 8 (e.g., a desired dimmer level of LEDs or a non-light generation mode, increase in current increases brightness and a decrease in current decreases brightness). In some examples, controller unit 6 may adjust the current of the power output of power converter 4 below a current threshold of load 8, which causes load 8 to enter a non-light generation mode. In other examples, controller unit 6 may adjust the voltage of a power output of power converter 4 according to an input received by link 16 indicating a desired dimmer level of load 8 (e.g., a desired dimmer level or a non-light generation mode of LEDs). In other examples, controller unit 6 may adjust the voltage of the power output of power converter 4 below a voltage threshold of load 8, which causes load 8 to enter a non-light generation mode (e.g., below the nominal forward voltage of LEDs causes the LEDs to turn off, eliminating light generation). In some examples, controller unit 6 may use any combination of adjusting the current and/or voltage of a power output of power convert 4 according to an input received by link 16 indicating a desired dimmer level of load (e.g., a desired dimmer level of LEDs or a non-light generation mode of LEDs).

Controller unit 6 may comprise any suitable arrangement of hardware, software, firmware, or any combination thereof, to perform the techniques attributed to controller unit 6 herein, such as, but not limited to, implementing a regulated first output parameter (e.g., current or voltage) from power converter 4 to load 8 and switching to a regulated second output parameter (e.g., current or voltage) from power converter 4 to load 8. For example, controller unit 6 may include any one or more microprocessors, digital signal processors (DSPs), application specific integrated circuits (ASICs), field programmable gate arrays (FPGAs), or any other equivalent integrated or discrete logic circuitry, as well as any combinations of such components. When controller unit 6 includes software or firmware, controller unit 6 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

As described in detail below, controller unit 6 may receive information over link 18 associated with the regulated power that has the second parameter (e.g., current or voltage). For instance, feedback control (e.g., voltage sensing or current sensing) circuitry of controller unit 6 may detect the voltage or current of the regulated power output at link 12 and driver/control logic of controller unit 6 may adjust the power output at link 12 based on the detected voltage or current to cause the regulated power output to have a different voltage or current that fits within a voltage or current tolerance window required by a dimmer interface in controller unit 6. For example, controller 6 may send command signals to power converter 4 to adjust the switching of the magnetic switch, which adjusts the output voltage, and subsequently adjusts the voltage at the secondary and auxiliary windings.

Load 8 may receive the regulated power that has the second parameter at link 14. Load 8 may use the regulated power having the second parameter to perform a function (e.g., increase the brightness of the LEDs, decrease the brightness of the LEDs, cause the LEDs to enter into a non-light generation mode, and/or the like).

Figure 2:
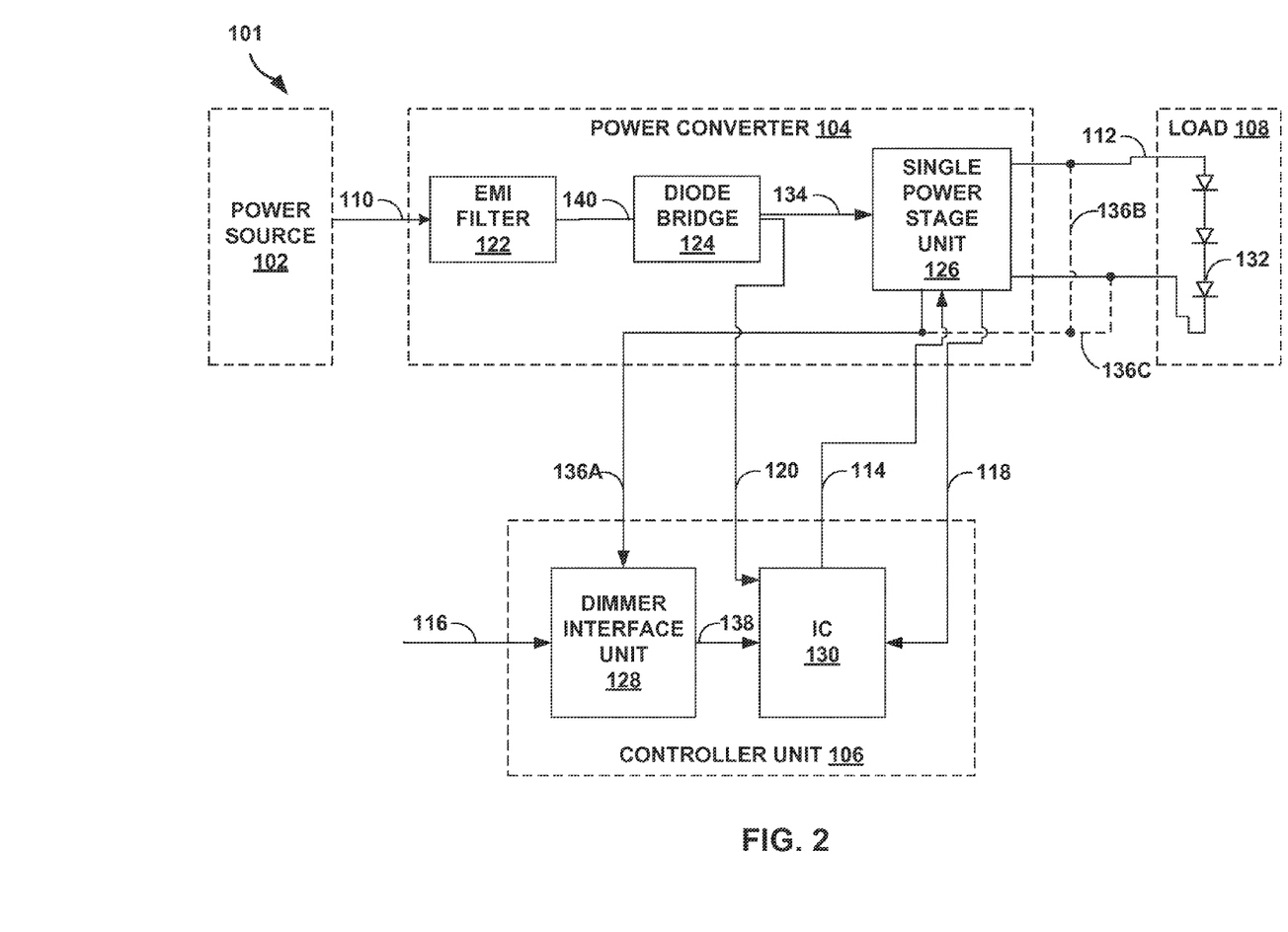
FIG. 2 is a block diagram illustrating an example of a system for converting power from a power source and turning off LEDs without an additional switch or a secondary power supply, in accordance with one or more aspects of the present disclosure.

FIG. 2 is a block diagram illustrating an example of system 101 for converting power from power source 102 and turning off LEDs 132 without an additional switch or a secondary power supply, in accordance with one or more aspects of the present disclosure. In the example of FIG. 2, power source 102, power converter 104, controller unit 106, load 108, and links 110-120 may correspond respectively to power source 2, power converter 4, controller unit 6, load 8, and links 10-20 as described in FIG. 1. In the example of FIG. 2, system 101 also includes EMI filter 122, diode bridge 124, single-stage unit 126, dimmer interface 128, integrated circuit (IC) 130, light-emitting-diodes (LEDs) 132, and links 134-138.

EMI filter 122 represents a line filter that is placed between electronic equipment and an external line to attenuate conducted radio frequency, also known as electromagnetic interference (EMI).

Diode bridge 124 represents an arrangement of four (or more) diodes in a bridge circuit configuration that provide the same polarity of output for either polarity of input. For example, diode bridge 124 converts an alternating current (AC) input into a direct current (DC) output.

Single-stage unit 126 represents a switched-mode power supply with a single power stage (e.g., a single ended switch topology). In some examples, single-stage unit 126 may include a non-isolated switched-mode power supply, such as a boost converter, buck converter, buck-boost converters, CUK converter, or the like. In other examples, single-stage unit 126 may include an isolated switched-mode power supply, such as a flyback transformer, flyback converter, or the like.

Dimmer interface unit 128 represents an electronic lighting control signaling device. In some examples, dimmer interface unit 128 may be a commonly used 0-10V or 1-10V standard, which varies a control signal of DC voltage from either zero to ten volts or from one to ten volts. In some examples, dimmer interface may unit 128 may receive an input (e.g., 10 volts) allowing dimmer interface unit 128 to control integrated circuit 130 (described below) to adjust the regulated current from power converter 104 at load 108 to achieve a target value or preset level (e.g., 100% light generation at load 108). In some examples, dimmer interface unit 128 may receive an input (e.g., 0 volts or any voltage) indicative of a non-light generation mode. In some examples, dimmer interface unit 128 may control integrated circuit 130 (described below) to either adjust the regulated current from power converter 104 or switch from adjusting the regulated current from power converter 104 at load 108 to regulating the voltage at load 108 to cause load 108 to enter a non-light generation mode. In some examples, where load 108 includes LEDs, the regulated voltage may be lower than the nominal forward voltage of the LEDs, causing load 108 to enter a non-light generation mode. In other examples, a radio frequency (RF) interface, a microprocessor, a digital addressable light interface (e.g., DALI™), a phase cut dimmer, a DMX lighting controller, a PLC, or the like may be used in place of a 0-10V dimmer interface. In some examples, dimmer interface unit 128 may be incorporated into IC 130. In other examples, any variable digital input or signal may be used in place of the 0-10V dimmer interface standard or the 1-10V dimmer interface standard.

Integrated circuit (IC) 130 represents a set of electronic circuits on one small plate of semiconductor material (e.g., silicon). For example, IC 130 represents feedback control circuitry, which can regulate the current and/or the voltage of the power output delivered by power converter 104 to load 108. In some examples, IC 130 receives feedback from links 118 and 120, and controls power converter 104 including single-stage unit 126 with link 114. In some examples, IC 130 may receive an input over link 116 representing a control signal from a dimmer interface unit 128, requiring IC 130 to adjust the regulated current of the power output from power converter 104 up or down depending the desired light generation level of load 108. In some examples, dimmer interface unit 128 may receive an (e.g., 8V) input, causing dimmer interface unit 128 to send a control signal to IC 130 over link 138 (described below) to adjust the regulated current of the power output of power converter 104 via link 114 to a preset level or target value (e.g., the light generation level of load 108 may be 80% or any light level for the 8V input). In some examples, dimmer interface unit 128 may receive a input (e.g., 0V or any voltage) indicative of a non-light generation mode, causing dimmer interface unit 128 to send a control signal to IC 130 over link 138 (described below) to either adjust the regulated current from power converter 104 or switch from adjusting the regulated current from power converter 104 at load 108 to regulating the voltage at load 108 to cause load 108 to enter a non-light generation mode. In some examples, where load 108 includes LEDs, the regulated voltage may be lower than the nominal forward voltage of the LEDs, causing load 108 to enter a non-light generation mode. In these same and different examples, where load 108 includes LEDs to generate light, the regulated voltage may be any voltage where the LEDs do not generate light.

Light-emitting-diodes 132 may represent one or more light-emitting-diodes (LEDs), which is a two-lead semiconductor light source that resembles a basic pn-junction diode and emits light in response to an electric current. In some examples, LEDs 132 may represent one or more organic light-emitting-diodes (OLEDs), which include an organic semiconductor between two electrodes, and the organic semiconductor emits light in response to an electric current. In some examples, LEDs 132 may represent one or more quantum dot LEDs, which includes a layer of quantum dots sandwiched between layers of electron-transporting and hole-transporting materials. In some examples, LEDs 132 may represent one or more electroluminescent elements, where a material emits light in response to the passage of an electric current or to a strong electric field. In some examples, when the anode lead of a LED may have a voltage more positive than the cathode lead by at least the forward voltage drop of the LED (e.g., nominal forward voltage, nominal voltage, and/or forward bias voltage), current will flow and light will emit from the LED. In other examples, when the anode lead of a LED may have a voltage that is less positive than the nominal forward voltage, the current flow through the LEDs may be very small and light will not emit from the LED. In other examples, when the anode lead of a LED may have a voltage that is more negative than the cathode lead (e.g., reverse bias voltage), the LED like any other diode blocks current flow until the LED reaches a breakdown voltage, and light will not emit from the LED. However, in other examples, LEDs may be assemblies, which may have elements that conduct in the reverse direction. In some examples, the light generation threshold (e.g., the nominal voltage) of LEDs 132 for light generation may be between 1.3 volts and 4.4 volts, or any amount of voltage required to turn on LEDs 132, including, but not limited to, LEDs, OLEDs, and quantum-dot LEDs. In some examples, the light generation threshold (e.g., the nominal current) of LEDs 132 for light generation may be any current at or near 0 amperes or any amount of current required to turn on LEDs 132, but not limited to, LEDs, OLEDs, and quantum-dot LEDs.

Links 134-140 may represent any medium capable of conducting electrical power from one location to another. Examples of links 134, 136A-136C (collectively "link 136"), 138, and 140 include, but are not limited to, physical and/or wireless electrical transmission mediums such as electrical wires, electrical traces, conductive gas tubes, twisted wire pairs, and the like. Each of links 134, 138, and 140 provide electrical coupling between, respectively, diode bridge 124 and single-stage unit 126, dimmer interface 128 and IC 130, and EMI filter 122 and diode bridge 124. Link 134 provides electrical coupling between diode bridge 124 and single-stage unit 126, such that diode bridge 124 provides a filtered and rectified DC power to single-stage unit 126, which is regulated by IC 130. Link 138 provides electrical coupling between dimmer interface 128 and IC 130, such that dimmer interface 128 provides a command signal to IC 130, which is used by IC 130 to determine whether to regulate the current of the power output of power converter 104 or switch to regulating the voltage of the power output of power converter 104 in response to a command signal indicative of a non-light generation mode of load 108. Link 136 provides electrical coupling between dimmer interface 128 and either single-stage unit 126 (e.g., link 136A) or link 112 (e.g., the anode side by link 136B and/or the cathode side by link 136C). In some examples, link 136 may provide the regulated output power from either single-stage unit 126 or link 112 in order to power dimmer interface 128. Link 140 provides electrical coupling between EMI filter 122 and diode bridge 124, such that diode bridge 124 receives a filtered AC power from EMI filter 122.

In the example of FIG. 2 in the context of single-stage unit 126 including a flyback converter, power source 102 provides AC mains or DC to EMI filter 122 in power converter 104 over link 110. EMI filter 122 filters the AC mains or DC received over link 110 and delivers the filtered AC or DC power over link 140 to diode bridge 124, which rectifies the filtered AC or DC power. Diode bridge 124 delivers the rectified AC or DC power to single-stage unit 126 and to IC 130 of controller unit 106 over links 134 and 120, respectively. IC 130 receives the rectified AC or DC power and determines based on the input from dimmer interface 128 over link 138 whether to deliver a regulated current from power converter 104 to load 108 over link 112, or whether to deliver a regulated voltage from power converter 104 to load 108 over link 112. In some examples, when dimmer interface 128 indicates a non-light generation mode is desired, the regulated voltage may be adjusted to below the nominal forward voltage of the LEDs at load 108. In some examples, IC 130 may receive feedback of the output power from link 118 to determine whether the regulated current and/or voltage at load 108 should be raised or lowered based on the input from dimmer interface 128 over link 138.

In some examples, dimmer interface unit 128 may receive any combination of voltage dimming curves (e.g., the dimming curve of dimmer interface 128 may turn off LEDs 132 at a voltage higher than 0V). In some examples, IC 130 controls the light output after receiving an input from dimmer interface unit 128, by delivering a command signal to single-stage 126 to adjust the regulated current or the regulated voltage of the power output delivered by power converter 104 to LEDs 132 of load 108, such that LEDs 132 generate light at a desired level or enter a non-light generation mode. In some examples, dimmer interface unit 128 may receive an input (e.g., 0V or any voltage indicative a non-light generation mode) and deliver a command signal to IC 130 to either adjust the regulated current from power converter 104 or switch from adjusting the regulated current from power converter 104 at load 108 to regulating the voltage at load 108 to cause load 108 to enter a non-light generation mode. In some examples, IC 130 regulates the current or voltage from power converter 104, by adjusting the switching of single-stage power unit 126. In some examples, controller unit 106 may adjust the switching of single-stage power unit 126, so the regulated voltage at LEDs 132 of load 108 may be below the nominal forward voltage, while providing enough supply voltage to IC 130 (e.g., Vcc) to keep IC 130 from shutting down. In some examples, controller unit 106 may adjust the switching of single-stage power unit 126, so the regulated voltage at LEDs 132 of load 108 may be below the nominal forward voltage, while providing enough supply voltage to dimmer interface 128 (e.g., Vcc or output voltage over link 136) to keep dimmer interface 128 from shutting down. In some examples, controller unit 106 may adjust the switching of single-stage power unit 126, so the regulated voltage at LEDs 132 of load 108 may be below the nominal forward voltage, while providing enough supply voltage (e.g., Vcc or an output voltage) to a dimmer (not shown) to keep the dimmer from shutting down.

In some examples, dimmer interface unit 128 and IC 130 may be on the same semiconductor device. In some examples, dimmer interface unit 128 may send a command signal to IC 130 after receiving any input indicating LEDs 132 should be in a non-light generation mode. In some examples, dimmer interface unit 128 may be either a digital addressable lighting interface (e.g., DALI™) or RF interface, which sends a command signal to IC 130 after receiving any input indicating LEDs 132 should be at a desired light level or in a non-light generation mode. In some examples, controller unit 106 may step the regulated voltage at different voltage thresholds, as the nominal forward voltage may be different for different LEDs (e.g., LEDs, OLEDs, quantum dot LEDs).

Figure 3:
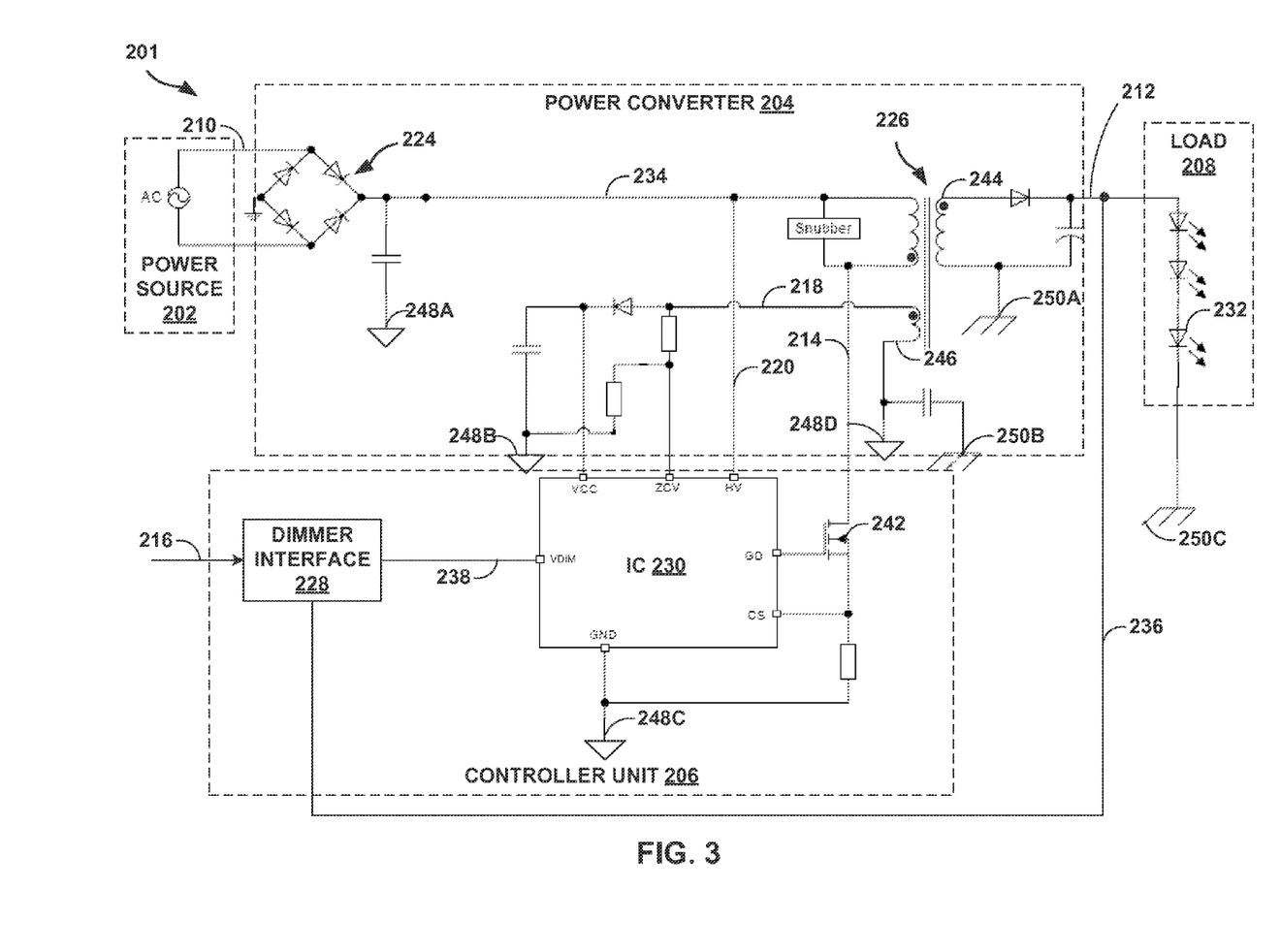
FIG. 3 is a circuit diagram illustrating an example of a system for converting power from a power source and turning off LEDs without an additional switch or a secondary power supply, in accordance with one or more aspects of the present disclosure.

FIG. 3 is a circuit diagram illustrating an example of system 201 for converting power from power source 202 and turning off LEDs 232 without an additional switch or a secondary power supply, in accordance with one or more aspects of the present disclosure. In the example of FIG. 3, power source 202, power converter 204, controller unit 206, load 208, and links 210-220 may correspond respectively to power source 2, power converter 4, controller unit 6, load 8, and links 10-20 as described in FIG. 1. In the example of FIG. 3, diode bridge 224, single-stage unit 226, dimmer interface 228, IC 230, LEDs 232, and links 234-238 may correspond respectively to diode bridge 124, single-stage unit 126, dimmer interface 128, IC 130, LEDs 132, and links 134-138 and as described in FIG. 2. In the example of FIG. 3, system 201 also includes MOSFET 242, secondary winding 244, and auxiliary winding 246, signal grounds 248A-248D (collectively "ground 248"), and chassis grounds 250A-250C (collectively "ground 250").

In the example of FIG. 3, single-stage unit 226 represents a flyback converter (e.g., a flyback transformer), as described above in FIGS. 1-2. Flyback converter 226 may be used in both AC/DC and DC/DC conversion with galvanic isolation between the input and any outputs. More precisely, the flyback converter is a buck boost converter with a coupled inductor, so that the voltage ratios are multiplied with an additional advantage of isolation. Flyback converter 226 is an isolated power converter, and therefore the isolation of the control circuit is also needed. The two prevailing control schemes are voltage mode control and current mode control, and require a signal related to the output voltage, such as a separate winding (e.g., auxiliary winding 246) on the coil and rely on the cross regulation of the design of flyback converter 226. In some examples, IC 230 regulates the current or voltage from power converter 204, by adjusting the switching of flyback converter 226, which adjusts the voltage available at secondary winding 244 and auxiliary winding 246. In some examples, controller unit 206 may adjust the switching of flyback converter 226, so the regulated voltage at LEDs 232 of load 208 may be below the nominal forward voltage, while providing enough supply voltage to IC 230 (e.g., Vcc) to keep IC 230 from shutting down. In some examples, controller unit 206 may also adjust the switching of flyback converter 226, so the regulated voltage at LEDs 232 of load 208 may be below the nominal forward voltage, while providing enough supply voltage (e.g., Vcc or output voltage over link 236) to dimmer interface 228 to keep dimmer interface 228 from shutting down. In some examples, controller unit 206 may also adjust the switching of flyback converter 226, so the regulated voltage at LEDs 232 of load 208 may be below the nominal forward voltage, while providing enough supply voltage (e.g., Vcc) to a dimmer (not shown) to keep the dimmer from shutting down.

In some examples, secondary winding 244 may supply a specific voltage to load 208 over link 212, and auxiliary winding 246 may supply a specific voltage, such as voltage Vcc to IC 230 of controller unit 206 that is dependent on the winding ratios between secondary winding 244 and auxiliary winding 246. In some examples, the windings of secondary winding 244 may have any winding ratio with auxiliary winding 246 that provides enough voltage (Vcc) to IC 230 to keep IC 230 from powering off when load 208 is in a non-light generation mode. In some examples, the voltage of secondary winding 244 may be referred to as the output voltage.

In some examples, the voltage of secondary winding 244 and/or voltage Vcc of auxiliary winding 246 may be regulated by adjusting the winding ratios between secondary winding 244 and auxiliary winding 246. In some examples, controller unit 206 may adjust the winding ratio (not shown) between secondary winding 244 and auxiliary winding 246, so the regulated voltage at LEDs 232 of load 208 may be below the nominal forward voltage, while providing enough supply voltage to IC 230 (e.g., Vcc) to keep IC 230 from shutting down. In some examples, controller unit 206 may adjust the winding ratio (not shown) between secondary winding 244 and auxiliary winding 246, so the regulated voltage at LEDs 232 of load 208 may be below the nominal forward voltage, while providing enough supply voltage to dimmer interface 228 (e.g., Vcc or an output voltage over link 236) to keep dimmer interface 228 from shutting down. In some examples, controller unit 206 may adjust the winding ratio (not shown) between secondary winding 244 and auxiliary winding 246, so the regulated voltage at LEDs 232 of load 208 may be below the nominal forward voltage, while providing enough supply voltage (e.g., Vcc) to a dimmer (not shown) to keep the dimmer from shutting down. In some examples, as LEDs 232 may vary in forward voltage, IC 230 of controller unit 206 may regulate auxiliary winding 246 to allow voltage Vcc to remain high enough to keep IC 230 from shutting down ensuring IC 230 receives the next input regarding dimmer levels. In some examples, IC 230 of controller unit 206 may indirectly regulate the voltage at load 208 below the nominal forward voltage of LEDs 232 by regulating voltage Vcc because voltage Vcc is proportional to the voltage at load 208. In some examples, IC 230 of controller unit 206 may directly regulate the voltage at load 208 below the nominal forward voltage of LEDs 232.

A benefit of adjusting or picking a specific winding ratio between secondary winding 244 and auxiliary winding 246, is that when LEDs 232 receive a regulated voltage below the nominal forward voltage of LEDs 232 from power converter 204, LEDs 232 will have no light generation and draw very little current, and IC 230 will not shut down thereby ensuring IC 230 receives the next command signal from dimmer interface 228. This benefit may also apply to dimmer interface 228 and/or a dimmer (not shown), which may receive a voltage from either secondary winding 244 (e.g., over link 236) and/or auxiliary winding 246, and may shut down, if there is not enough supply voltage from either secondary winding 244 or auxiliary winding 246. Another benefit of adjusting or picking a specific winding ratio between secondary winding 244 and auxiliary winding 246, so that LEDs 232 may receive a regulated voltage below the nominal forward voltage of LEDs 232 from power converter 204, is that system 202 may not require a switch to disconnect LEDs 232 from flyback converter 226. Another benefit of adjusting or picking a specific winding ratio between secondary winding 244 and auxiliary 246, so that LEDs 232 receive a regulated voltage below the nominal forward voltage of LEDs 232 from power converter 204, is that system 201 will not require a secondary power supply to power either dimmer interface 228 and/or IC 230.

In the example of FIG. 3 power source 202 provides AC mains to diode bridge 224 of power converter 204 over link 210. Diode bridge 224 rectifies the AC power. Diode bridge 224 delivers the rectified DC power to flyback converter 226 and to IC 230 of controller unit 206 over links 234 and 220, respectively. IC 230 receives the rectified DC power at the high-voltage (HV) pin and charges a Vcc capacitor, and IC 230 receives an input (e.g., with respect to 0-10V received at dimmer interface 228) at the dimmer voltage (VDIM) pin from dimmer interface 228 over link 238. IC 230 using the input at VDIM pin determines whether to deliver a regulated current (e.g., turn on LEDs 232 to generate light, turn off LEDs 232 by eliminating current) from power converter 204 to load 208 over link 212, or whether to deliver a regulated voltage (e.g., turn on LEDs 232 to generate light, turn off LEDs 232 to eliminate light generation) from power converter 204 to load 208 over link 212. In some examples, where the input from dimmer input 228 is indicative of a non-light generation mode, the regulated voltage may be adjusted by IC 230 to be below the nominal forward voltage of one or more LEDs 232 at load 208. IC 230 may receive feedback of the output power from link 218 (e.g., Vcc) to determine whether the regulated current and/or voltage at load 208 should be raised or lowered based on the input received by IC 230 from dimmer interface 228 over link 238. In some examples, IC 230 may also receive feedback regarding the output power directly from link 212.

In some examples, dimmer interface unit 228 may receive an input (e.g., 8V), dimmer interface unit 228 may deliver a command signal to IC 230 to adjust the regulated current of the power output delivered by power converter 204 to LEDs 232 of load 208 to achieve the desired light level (e.g., the light generation of LEDs 232 is 80%). In some examples, dimmer interface unit 228 may receive an input (e.g., 0V or any voltage) indicative of a non-light generation mode, and dimmer interface unit 228 may deliver a command signal to IC 230 to either adjust the regulated current from power converter 204 or switch from adjusting the regulated current from power converter 204 at load 208 to regulating the voltage at load 208 to cause load 208 to enter a non-light generation mode. In some examples, dimmer interface unit 228 and IC 230 may be on the same semiconductor device. In some examples, dimmer interface unit 228 may send a command signal to IC 230 after receiving any input indicating LEDs 232 should be in a non-light generation mode. In some examples, controller unit 206 may step the regulated voltage at different thresholds, as the nominal forward voltage may be different for different LEDs (e.g., LEDs, OLEDs, or quantum-dot LEDs). In some examples, the light generation threshold (e.g., the nominal voltage) of LEDs 232 for light generation may be between 1.3 volts and 4.4 volts, or any amount of voltage required to turn on LEDs 232, including, but not limited to, LEDs, OLEDs, and quantum-dot LEDs. In some examples, the light generation threshold (e.g., the nominal current) of LEDs 232 for light generation may be any current greater than 0 amperes or any amount of current required to turn on LEDs 232, but not limited to, LEDs, OLEDs, and quantum-dot LEDs.

Figure 4:
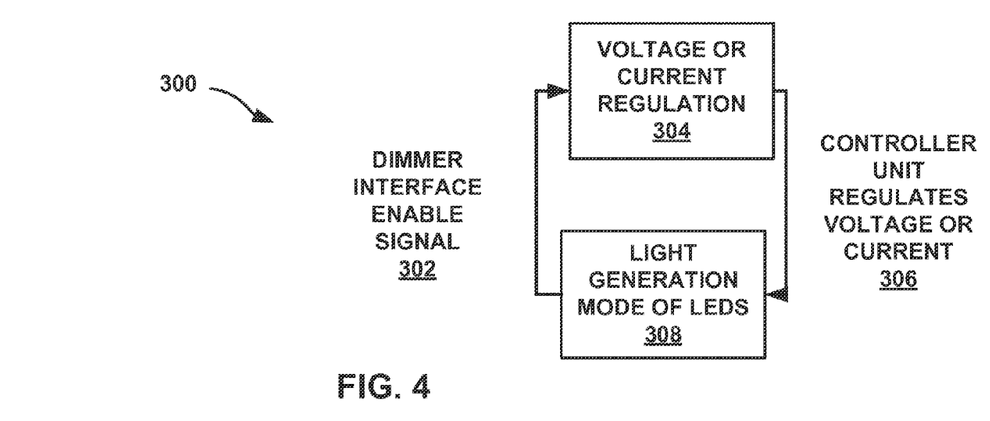
FIG. 4 is a flowchart illustrating an example of operations of a controller unit with a dimmer interface, in accordance with an example of this disclosure that illustrates a process of enabling voltage or current regulation with a dimmer interface enable signal.

FIG. 4 is a flowchart illustrating an example of operations 300 of a controller unit with a dimmer interface, in accordance with an example of this disclosure that illustrates a process of enabling voltage or current regulation 304 with dimmer interface enable signal 302. FIG. 4 is described with respect to FIG. 2. In the example of FIG. 4, a dimmer interface (e.g., dimmer interface 128), may receive an enable signal 302 (e.g., any input indicative of light generation) causing a controller unit (e.g., controller unit 106) to enter into voltage or current regulation 304. In voltage or current regulation 304, controller unit 106 may regulate the voltage or current 306 at the load (e.g., load 108) by adjusting the switching of a power converter (e.g., power converter 104) to deliver a regulated voltage or current to load 108 over a link (e.g., link 112). The regulated voltage or current 306 at load 108 is above a light generation threshold (e.g., greater than a nominal voltage and current of LEDs 132) causing one or more LEDs (e.g., LEDs 132) to enter into light generation mode 308.

Figure 5:
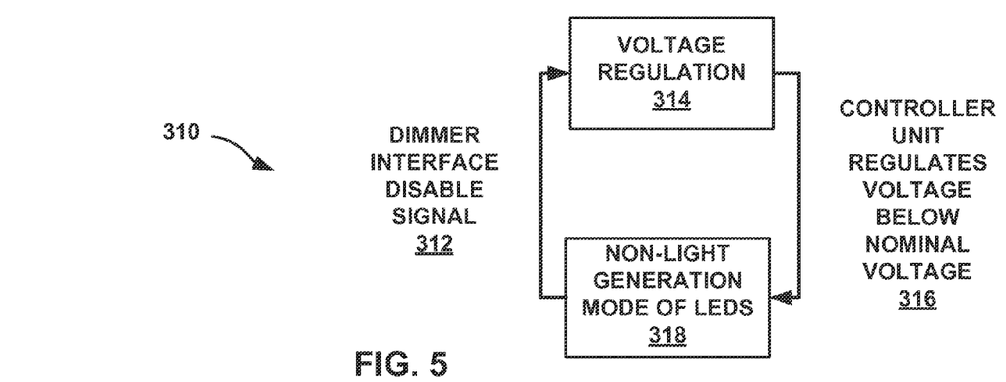
FIG. 5 is a flowchart illustrating an example of operations of a controller unit with a dimmer interface, in accordance with an example of this disclosure that illustrates a process of enabling voltage regulation with a dimmer interface disable signal.

FIG. 5 is a flowchart illustrating an example of operations 310 of a controller unit with a dimmer interface, in accordance with an example of this disclosure that illustrates a process of enabling voltage regulation 314 with dimmer interface disable signal 312. FIG. 5 is described with respect to FIG. 2. In the example of FIG. 5, a dimmer interface (e.g., dimmer interface 128) may receive a disable (e.g., 0V input, or any input indicative of a non-light generation mode) signal 312 over a link (e.g., link 116), causing a controller unit (e.g., controller unit 106) to enter into voltage regulation 314. In voltage regulation 314, controller unit 106 may regulate a voltage at the load (e.g., load 108) by adjusting the switching of a power converter (e.g., power converter 104) to deliver a regulated voltage to load 108 over a link (e.g., link 112).

In some examples, the regulated voltage at load 108 from controller unit 106 may be below a nominal voltage 316 of one or more LEDs (e.g., LEDs 132) causing the LEDs to enter into non-light generation mode 318. In some examples, the regulated voltage at load 108 may be any voltage that causes the LEDs to enter into a non-light generation mode 318. In some examples, the regulated voltage at load 108 may be below a nominal voltage 316 of one or more LEDs 132, while high enough to maintain a supply voltage to an integrated circuit (e.g., IC 130). In some examples, the regulated voltage at load 108 may be below a nominal voltage 316 of one or more LEDs 132, while high enough to maintain a supply voltage to a dimmer interface (e.g., dimmer interface 128) and/or a dimmer.

Figure 6:
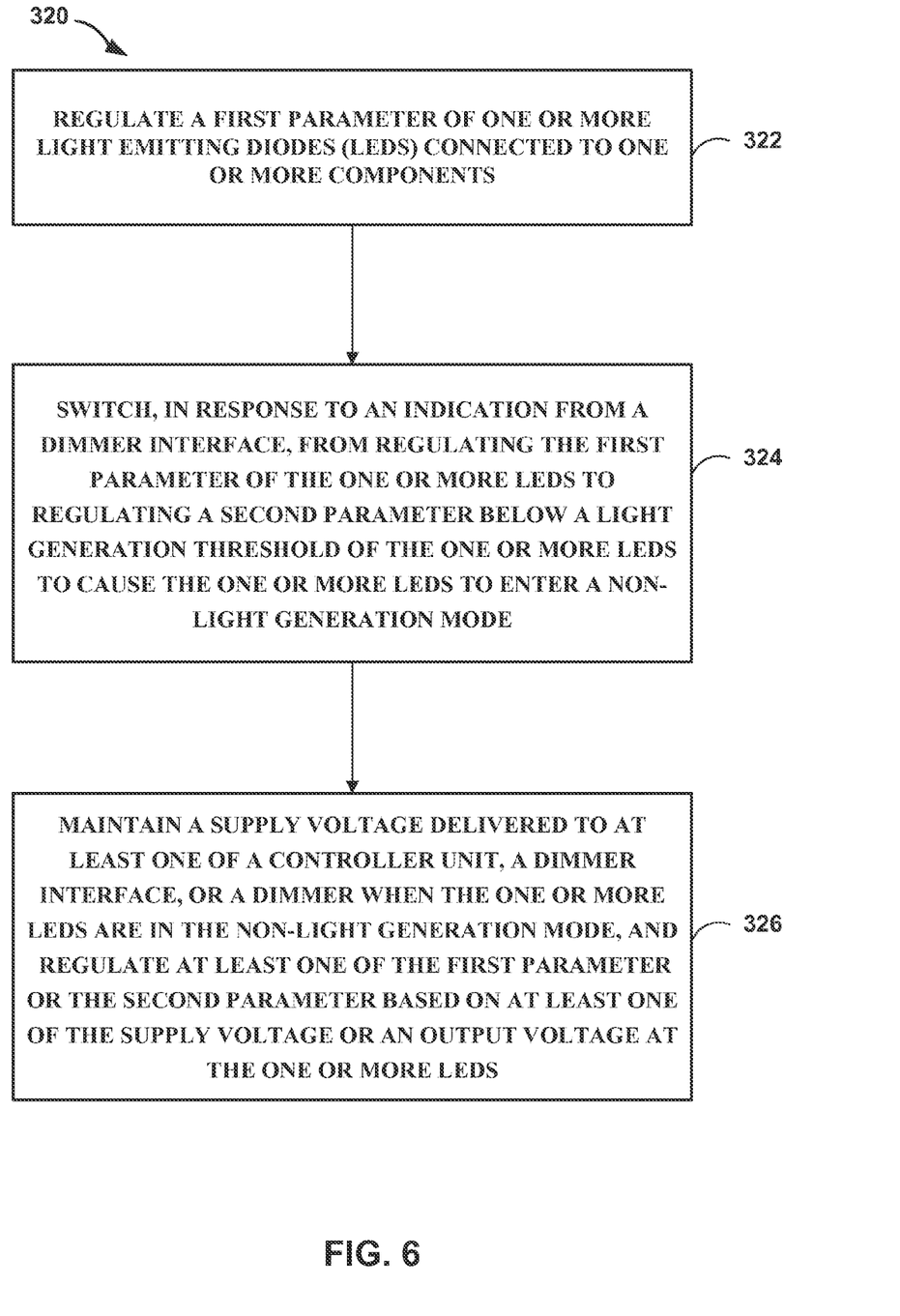
FIG. 6 is a flowchart illustrating an example process of a controller unit as described in FIG. 1, in accordance with one or more aspects of the present disclosure.

FIG. 6 is a flowchart illustrating an example process 320 of controller unit 6 as described in FIG. 1, in accordance with the examples of this disclosure. FIG. 6 is described with respect to FIG. 2. In the example of FIG. 6, control circuitry (e.g., controller unit 106), regulates a first parameter of one or more light emitting diodes (LEDs) (e.g., LEDs 132)(step 322), and switches, in response to an indication from a dimmer interface, from regulating the first parameter of the one or more LEDs to regulating a second parameter below a light generation threshold of the one or more LEDs (e.g., forward voltage or nominal forward voltage) causing the one or more LEDs to enter a non-light generation mode (step 324). In the example of FIG. 6, control circuitry may also maintain a supply voltage delivered to at least one of a controller unit, a dimmer interface, or a dimmer when the one or more LEDs are in the non-light generation mode, and regulate at least one of the first parameter or the second parameter based on at least one of the supply voltage or an output voltage at the one or more LEDs (326).

In some examples, the first parameter may be one of a current or a voltage and the second parameter may be one of a current or a voltage. In some examples, the second parameter may include one of a current or a voltage less than a light generation threshold. In some examples, the first parameter may be a first voltage equal to or above the light generation threshold, and the second parameter may be a second voltage below the light generation threshold. In some examples, one or more components may include a single-stage power converter, which may be one of a flyback converter, a buck converter, a boost converter, or a non-isolated buck-boost converter. In some examples, the light generation threshold may be a nominal voltage and/or a nominal current of the one or more LEDs. In some examples, regulating the first parameter and the second parameter is performed by a controller unit, and the controller unit may further include an integrated circuit and a dimmer interface. In some examples, the dimmer interface may be selected from a group consisting essentially of a 0-10V dimmer interface, an RF interface, a digital addressable light interface (e.g., DALI™), a phase cut dimmer, a programmable logic controller, a digital multiplex (DMX) lighting controller, or a processor.

Any of the methods, devices, and circuits described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

Various embodiments of the invention have been described. These and other embodiments are within the scope of the following claims.

The invention claimed is:

1. A method comprising:
regulating a first parameter of one or more light emitting diodes (LEDs) connected to one or more components; and
switching, in response to an indication from a dimmer interface, from regulating the first parameter of the one or more LEDs to regulating a second parameter below a light generation threshold of the one or more LEDs, wherein switching from regulating the first parameter to regulating the second parameter causes the one or more LEDs to enter a non-light generation mode;
wherein the switching from regulating the first parameter to regulating the second parameter is performed by adjusting a winding ratio between a secondary winding of a transformer and an auxiliary winding of the transformer.

2. The method of claim 1, further comprising:
maintaining a supply voltage delivered to at least one of a controller unit, a dimmer interface, or a dimmer when the one or more LEDs are in the non-light generation mode, and
wherein regulating at least one of the first parameter or the second parameter is based on at least one of the supply voltage or an output voltage at the one or more LEDs.

3. The method of claim 1, wherein the first parameter is at least one of a current or a voltage and the second parameter is at least one of a current or a voltage.

4. The method of claim 1, wherein the second parameter comprises at least one of a current or a voltage less than the light generation threshold.

5. The method of claim 1, wherein the first parameter is a first voltage equal to or above the light generation threshold, and wherein the second parameter is a second voltage below the light generation threshold.

6. The method of claim 1, wherein the one or more components comprises a single-stage power converter, and wherein the single-stage power converter comprises at least one of:
a flyback converter,
a buck converter,
a boost converter,
a non-isolated buck-boost converter, or
a CUK converter.

7. The method of claim 1, wherein the light generation threshold is either a nominal voltage or a nominal current of the one or more LEDs.

8. The method of claim 1, wherein regulating the first parameter and the second parameter is performed by a controller unit, and wherein the controller unit further comprises an integrated circuit and the dimmer interface.

9. The method of claim 8, wherein the dimmer interface is at least one member selected from a group consisting of:
a 0-10V dimmer interface,
a 1-10V dimmer interface,
a voltage interface,
a current interface, an RF interface,
a digital addressable light interface,
a phase cut dimmer,
a programmable logic controller,
a digital multiplex (DMX) lighting controller,
an Ethernet interface,
a processor,
an optical interface, and
an infrared interface.

10. The method of claim 1, wherein the adjusting a winding ratio between a secondary winding of a transformer and an auxiliary winding of the transformer is performed by at least one of a controller unit, a dimmer interface, or a dimmer.

11. A device comprising:
one or more components configured to apply at least one of a regulated current or a regulated voltage to a load, wherein the load includes one or more light-emitting-diodes (LEDs);
a transformer coupled between the one or more components and the load, wherein the transformer comprises a secondary winding and an auxiliary winding; and
a controller unit configured to regulate a first parameter of the one or more LEDs connected to the one or more components, wherein the controller unit, in response to an indication from a dimmer interface, adjusts a winding ratio between the secondary winding of the transformer and the auxiliary winding of the transformer to switch from regulating the first parameter of the one or more LEDs to regulating a second parameter below a light generation threshold of the one or more LEDs, wherein switching from regulating the first parameter to regulating the second parameter causes the one or more LEDs to enter a non-light generation mode.

12. The device of claim 11, wherein the controller unit is further configured to:
maintain a supply voltage delivered to at least one of a controller unit, a dimmer interface, or a dimmer when the one or more LEDs are in the non-light generation mode; and
regulate at least one of the first parameter or the second parameter based on at least one of the supply voltage or an output voltage at the one or more LEDs.

13. The device of claim 11, wherein the first parameter is at least one of a current or a voltage and the second parameter is at least one of a current or a voltage.

14. The device of claim 11, wherein the second parameter comprises at least one of a current or a voltage less than the light generation threshold.

15. The device of claim 11, wherein the one or more components comprises a single-stage power converter, and wherein the single-stage power converter comprises at least one of:
a flyback converter,
a buck converter,
a boost converter,
a non-isolated buck-boost converter, or
a CUK converter.

16. The device of claim 11, wherein the light generation threshold is either a nominal voltage or a nominal current of the one or more LEDs.

17. The device of claim 11, wherein the controller unit comprises an integrated circuit and a dimmer interface, and wherein the dimmer interface is at least one member selected from a group consisting of:
a 0-10V dimmer interface,
a 1-10V dimmer interface,
a voltage interface,
a current interface,
an RF interface,
a digital addressable light interface,
a phase cut dimmer,
a programmable logic controller,
a digital multiplex (DMX) lighting controller,
an Ethernet interface,
a processor,
an optical interface, and
an infrared interface.

18. A circuit comprising:
one or more components configured to apply at least one of a regulated current or a regulated voltage at a load, wherein the load includes one or more light-emitting-diodes (LEDs);
a transformer coupled between the one or more components and the load, wherein the transformer comprises a secondary winding and an auxiliary winding; and
a controller unit configured to regulate a first parameter of the one or more LEDs connected to one or more components, wherein the controller unit, in response to an indication from a dimmer interface, adjusts a winding ratio between the secondary winding of the transformer and the auxiliary winding of the transformer to switch from regulating the first parameter of the one or more LEDs to regulating a second parameter below a light generation threshold of the one or more LEDs, wherein switching from regulating the first parameter to regulating the second parameter causes the one or more LEDs to enter a non-light generation mode.

19. The circuit of claim 18, wherein the controller unit is further configured to:
maintain a supply voltage delivered to at least one of a controller unit, a dimmer interface, or a dimmer when the one or more LEDs are in the non-light generation mode; and
regulate at least one of the first parameter or the second parameter based on at least one of the supply voltage or an output voltage at the one or more LEDs.

20. The circuit of claim 18, wherein the light generation threshold is either a nominal voltage or a nominal current of the one or more LEDs.

21. The circuit of claim 18, wherein the first parameter is at least one of a current or a voltage and the second parameter comprises at least one of a current or a voltage less than the light generation threshold.

\* \* \* \* \*